US011795317B2

(12) United States Patent
Ohkubo et al.

(10) Patent No.: US 11,795,317 B2
(45) Date of Patent: Oct. 24, 2023

(54) LAMINATED BODY INCLUDING RESIN BODY AND GEL BODY AND METHOD FOR PRODUCING SAME

(71) Applicants: OSAKA UNIVERSITY, Suita (JP); KABUSHIKI KAISHA TOSHIBA, Tokyo (JP)

(72) Inventors: Yuji Ohkubo, Suita (JP); Kazuya Yamamura, Suita (JP); Erika Miyake, Suita (JP); Izuru Komatsu, Tokyo (JP)

(73) Assignees: OSAKA UNIVERSITY, Osaka (JP); KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/988,988

(22) Filed: Nov. 17, 2022

(65) Prior Publication Data

US 2023/0167292 A1    Jun. 1, 2023

(30) Foreign Application Priority Data

Nov. 30, 2021 (JP) ................. 2021-194990

(51) Int. Cl.
| | | |
|---|---|---|
| C08L 27/18 | (2006.01) | |
| B32B 27/08 | (2006.01) | |
| B32B 27/20 | (2006.01) | |
| B32B 27/28 | (2006.01) | |
| B32B 27/32 | (2006.01) | |
| B32B 33/00 | (2006.01) | |

(52) U.S. Cl.
CPC ............. *C08L 27/18* (2013.01); *B32B 27/08* (2013.01); *B32B 27/20* (2013.01); *B32B 27/283* (2013.01); *B32B 27/322* (2013.01); *B32B 33/00* (2013.01); *B32B 2250/02* (2013.01); *B32B 2250/24* (2013.01); *B32B 2264/1021* (2020.08); *B32B 2305/30* (2013.01); *B32B 2307/70* (2013.01); *B32B 2310/14* (2013.01); *B32B 2327/18* (2013.01); *B32B 2383/00* (2013.01)

(58) Field of Classification Search
None
See application file for complete search history.

(56) References Cited

U.S. PATENT DOCUMENTS

| | | | | |
|---|---|---|---|---|
| 3,838,094 | A * | 9/1974 | Sporck | ..................... H01B 3/40 523/213 |
| 2013/0284245 | A1* | 10/2013 | Kim | ..................... H01L 31/04 427/535 |
| 2020/0392338 | A1* | 12/2020 | Araki | ..................... C08L 83/04 |
| 2021/0120684 | A1 | 4/2021 | Komatsu et al. | |

FOREIGN PATENT DOCUMENTS

| | | |
|---|---|---|
| JP | 2015-122448 | 7/2015 |
| JP | 2020-161569 | 10/2020 |

* cited by examiner

*Primary Examiner* — Ramsey Zacharia
(74) *Attorney, Agent, or Firm* — Wenderoth, Lind & Ponack, L.L.P.

(57) ABSTRACT

Provided is a laminated body that has high adhesiveness between a resin body containing a fluorine-based resin and a silicone gel and that can be attached to and detached from an adherend for use. A laminated body comprising: a resin body; and a gel body, wherein the resin body comprises a fluorine-based resin, and the gel body comprises a silicone gel and lipophilic silica particles.

7 Claims, 2 Drawing Sheets

[FIG. 1A]
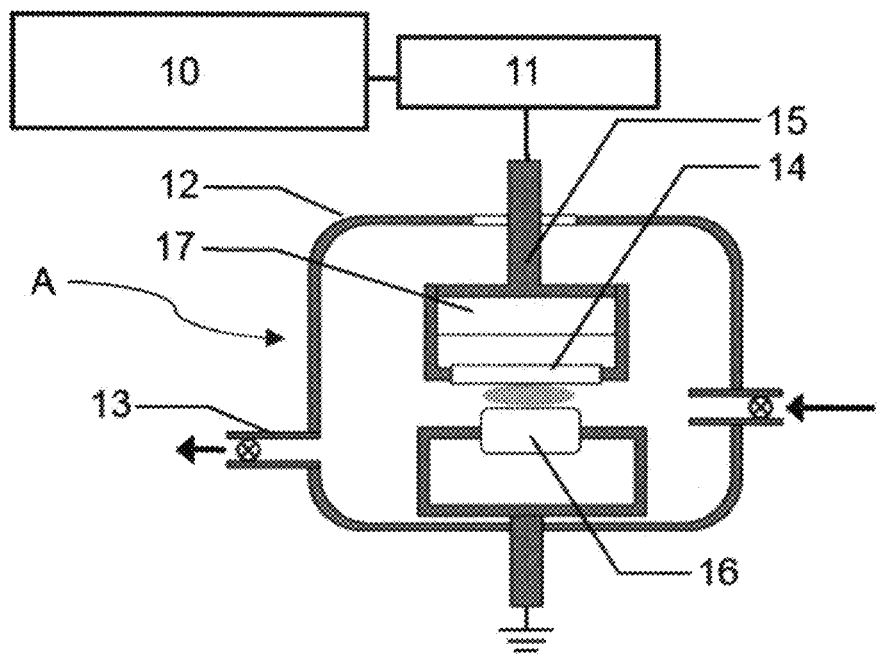
[FIG. 1B]
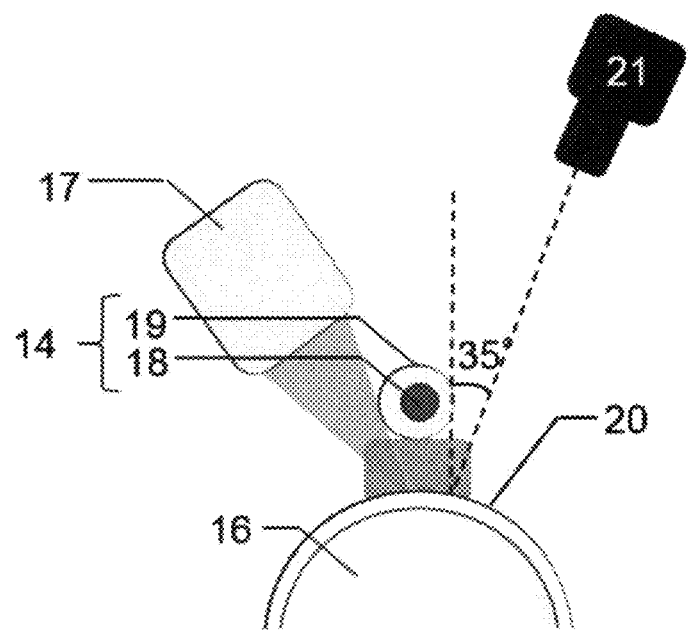

[FIG. 2]
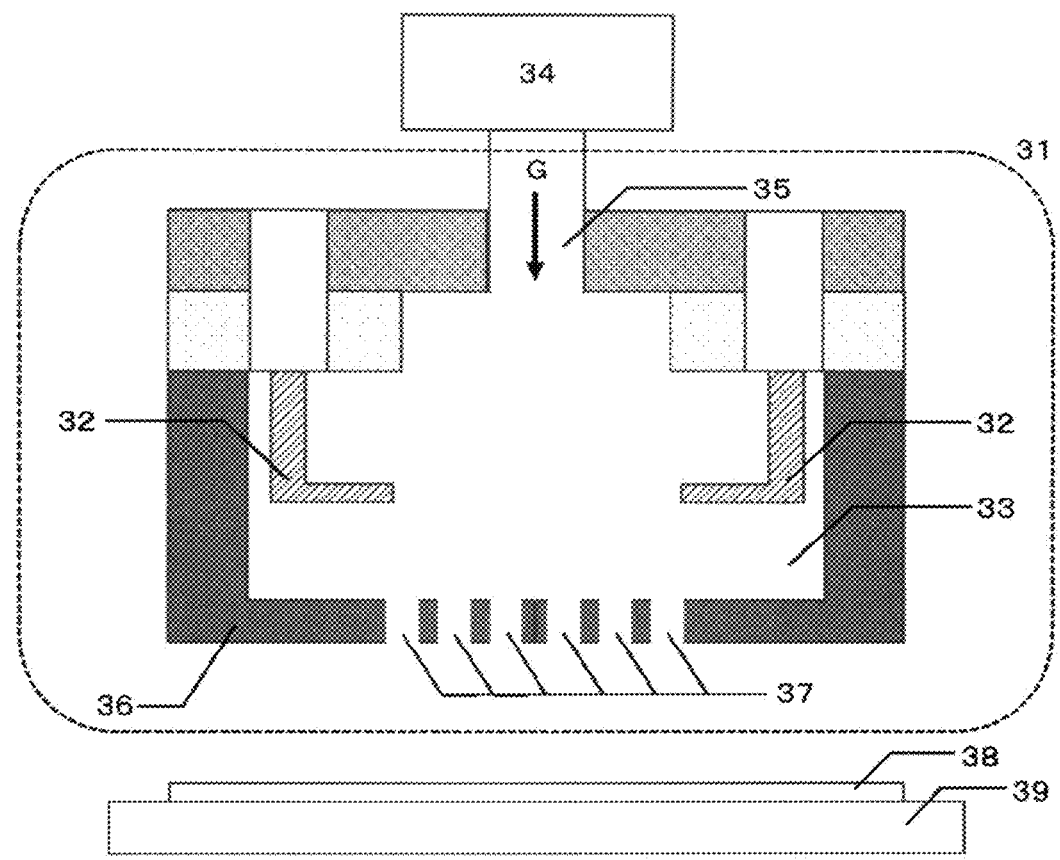

LAMINATED BODY INCLUDING RESIN BODY AND GEL BODY AND METHOD FOR PRODUCING SAME

CROSS-REFERENCE TO RELATED APPLICATIONS

This application is related to and claims priority under 35 U.S.C. 119 to Japanese patent application No. 2021-194990, filed on Nov. 30, 2021.

TECHNICAL FIELD

An embodiment of the present invention relates to a laminated body including a resin body and a gel body and a method for producing the same.

BACKGROUND ART

Advancement of a miniaturization technology for computers has led to incorporation of a sensor, an actuator, a microcomputer and the like into an IoT (Internet of Things) device. The IoT device is provided in, for example, a home appliance such as a speaker, lighting equipment and air-conditioning equipment, an architectural structure such as a tunnel, bridge and a high-rise building, and a wearable device attached to a helmet, a living body and the like, and can check a status of an apparatus, a human body and the like at all times.

In recent years, the IoT device has been required to send and receive a larger amount of data at a high speed. To meet such a requirement, attention is drawn to use of a high-frequency band to increase a transmission information capacity, and particular attention is drawn to use of a high frequency wave of 30 GHz or more, which is called a millimeter wave. However, the high-frequency band tends to face a large transmission loss in a transmission path of the high-frequency band whereas the high-frequency band has a significantly high transmission information capacity. A larger transmission loss leads to such inconvenience as an electrical signal loss and a longer signal delay time.

For an application of the high-frequency band, a fluorine-based resin having a low relative permittivity and a low dielectric dissipation factor is considered to be used to reduce a transmission loss. The fluorine-based resin is to be used as a resin substrate of a printed wiring board in the IoT device to make the IoT device compatible with use of the high-frequency band.

For example, Patent Document 1 discloses a fluorine resin substrate used for a biological information measuring device that outputs information on a living body or used for an artificial organ in a living body. The fluorine resin substrate contains a fluorine resin as a main component of the fluorine resin substrate and has a modified layer in at least a part of an outer surface of the fluorine resin substrate. The modified layer contains siloxane bonds and hydrophilic organic functional groups and has excellent adhesiveness to human cells.

Patent Document 2 discloses an electronic device including a housing and an electronic component provided inside the housing. The electronic device is attached to a human or an object for use. The housing includes a lower surface part including a contact surface contacting an adherend, an upper surface part separated in a vertical direction from the lower surface part with a first space interposed, and a side surface part provided around the first space and connected to the upper surface part and the lower surface part.

RELATED ART DOCUMENTS

Patent Documents

Patent Document 1: JP2015-122448A
Patent Document 2: JP2020-161569A

SUMMARY OF THE INVENTION

Technical Problem

In recent years, it has been considered that the IoT device is not only installed on a specific point of an adherend but also adhered to and removed from (attached to and detached from) the adherend such as a human and an object, and thus is used by changing an installation position according to a purpose of the IoT device. Although Patent Document 1 mentions adhesion of the fluorine resin substrate to such an adherend, Patent Document 1 does not assume removal, or attachment and detachment of the fluorine resin substrate.

Patent Document 2 does not disclose such removal, or attachment and detachment. However, Patent Document 2 discloses Teflon (registered trademark) as one of materials for the upper surface part and discloses a silicone gel, a urethane gel or an acrylic gel as a material for the lower surface part to be attached to the adherend. Such a housing (a laminated body) can be attached to the adherend to some degree. However, even though a fluorine-based resin such as the Teflon (polytetrafluoroethylene) is attached to one of the silicone gel, the urethane gel or the acrylic gel, an adhesive strength between the fluorine-based resin and the gel does not suffice. As a result, the laminated body might be separated or broken when the laminated body is removed from the adherend.

An object of an embodiment of the present invention is to provide a laminated body that has high adhesiveness between a resin body containing a fluorine-based resin and a silicone gel and that can be attached to and detached from an adherend for use.

Solutions to the Problems

In view of the above problems, the present inventors have conducted earnest studies. As a result, the present inventors have found the followings and completed the present invention: an adhesive strength between a resin body and a gel body is improved by adding lipophilic silica particles to the gel body, heat-curing the gel body and performing plasma treatment on a surface of the heat-cured gel body with an oxygen concentration near the surface of the heat-cured gel body being 1% or more by volume or by laminating a surface-modified resin body and an uncured gel-like material and then heat-curing the gel-like material to form the gel body.

That is, an embodiment of the present invention has the following configurations.

[1] A laminated body comprising:
a resin body; and
a gel body,
wherein the resin body comprises a fluorine-based resin, and
the gel body comprises a silicone gel and lipophilic silica particles.

[2] The laminated body according to above [1],
wherein an adhesive strength between the resin body and the gel body is 0.4 N/mm or more.

[3] The laminated body according to above [1] or [2], wherein the lipophilic silica particles have surfaces modified with at least one of dialkylsilane, trialkylsilane, polysiloxane, aminosilane or polysilazane.

[4] The laminated body according to any one of above [1] to [3],
wherein the fluorine-based resin is polytetrafluoroethylene or a copolymer of at least one of a hexafluoropropylene unit, a perfluoroalkyl vinyl ether unit, a methylene unit, an ethylene unit or a perfluorodioxole unit and at least one of a difluoromethylene unit or a tetrafluoroethylene unit.

[5] The laminated body according to any one of above [1] to [4],
wherein the resin body has a plasma-treated surface.

[6] A method for producing a laminated body comprising a resin body and
a gel body, the method comprising:
a step of producing a surface-modified resin body by performing plasma treatment on a surface of the resin body with an oxygen concentration near the surface of the resin body being less than 0.5% by volume; and
the following step (I) or step (II),
wherein the resin body comprises a fluorine-based resin, and
the gel body comprises a silicone gel and lipophilic silica particles.
(I) heat-curing the gel body and performing plasma treatment on a surface of the heat-cured gel body with an oxygen concentration near the surface of the heat-cured gel body being 1% or more by volume to produce a surface-modified gel body, and then laminating the surface-modified gel body and the surface-modified resin body
(II) laminating the surface-modified resin body and a gel-like material and then heat-curing the gel-like material to form the gel body Advantageous Effects of the Invention The laminated body that has high adhesiveness between the resin body containing the fluorine-based resin and the silicone gel and that can be attached to and detached from an adherend for use can be produced by adding the lipophilic silica particles to the gel body, heat-curing the gel body and performing the plasma treatment on the surface of the heat-cured gel body with the oxygen concentration near the surface of the heat-cured gel body being 1% or more by volume or can be produced by laminating the surface-modified resin body and the uncured gel-like material and then heat-curing the gel-like material to form the gel body. The laminated body according to an embodiment of the present invention is not broken when the laminated body is removed from the adherend. Hence, the laminated body can be freely attached to and detached from the adherend, enabling an installation position of the laminated body to be freely changed according to an application purpose of the laminated body. Since the installation position can be freely changed, the laminated body can be used not only as an IoT device for a high frequency wave but also as an attachable and detachable fluorine-based resin sheet or an attachable and detachable fluorine-based resin mat for temporarily preventing a chemical from splashing or for temporarily improving slipperiness.

BRIEF DESCRIPTION OF DRAWINGS

FIG. 1A and FIG. 1B are conceptual diagrams of an atmospheric pressure plasma treatment apparatus, wherein FIG. 1A is a side view of the entire atmospheric pressure plasma treatment apparatus and FIG. 1B is a plan view showing a relationship between a rod-shaped electrode and a substrate.

FIG. 2 is a conceptual diagram of a plasma irradiation head in a plasma jet treatment apparatus.

DESCRIPTION OF EMBODIMENTS

A laminated body according to an embodiment of the present invention is a laminated body including a resin body and a gel body (hereinafter may be simply referred to as "laminated body"). The resin body contains a fluorine-based resin, and the gel body contains a silicone gel and lipophilic silica particles. In the present description, the fluorine-based resin refers to a resin containing fluorine atoms in molecules of the resin.

<Resin Body>

The fluorine-based resin is preferably polytetrafluoroethylene or a copolymer of at least one of a hexafluoropropylene unit, a perfluoroalkyl vinyl ether unit, a methylene unit, an ethylene unit or a perfluorodioxole unit and at least one of a difluoromethylene unit or a tetrafluoroethylene unit. Among these, the fluorine-based resin more preferably contains the tetrafluoroethylene unit. In 100% by mol of the entire resin contained in the resin body, a content of the tetrafluoroethylene unit is more preferably 30% or more by mol, further preferably 50% or more by mol, particularly preferably 70% or more by mol and most preferably 90% or more by mol. The tetrafluoroethylene unit is a constituent unit derived from tetrafluoroethylene, and the same applies to the other monomer units.

Examples of the fluorine-based resin include polytetrafluoroethylene (PTFE), polychlorotrifluoroethylene (PCTFE), polyvinylidene fluoride (PVDF), polyvinyl fluoride (PVF), a tetrafluoroethylene-hexafluoropropylene copolymer (FEP), a tetrafluoroethylene-perfluoroalkyl vinyl ether copolymer (PFA), a tetrafluoroethylene-ethylene copolymer (ETFE), a tetrafluoroethylene-perfluorodioxole copolymer (TFE/PDD) and a chlorotrifluoroethylene-ethylene copolymer (ECTFE). Among these, from the viewpoint of the number of carbon-fluorine bonds (a substitution ratio of fluorine atoms) of the monomer unit, preference is given to at least one of PTFE, PFA, ETFE or FEP, and particular preference is given to PTFE. The fluorine-based resin may be one kind or may contain two or more kinds. In 100 parts by mass of the entire resin contained in the resin body used in an embodiment of the present invention, a content of the fluorine-based resin is more than 50 parts by mass, preferably 80 parts or more by mass, more preferably 90 parts or more by mass, further preferably 95 parts or more by mass, particularly preferably 99 parts or more by mass and most preferably 100 parts by mass (only the fluorine-based resin is contained).

The resin body used in an embodiment of the present invention may contain a resin other than the above fluorine-based resin. Examples of the resin other than the fluorine-based resin include: an olefin-based resin such as a polyethylene resin, a polypropylene resin and a cycloolefin resin; a polyester-based resin such as a polyethylene terephthalate resin; a polyimide-based resin; a styrene-based resin such as a styrene resin and a syndiotactic polystyrene resin; an aromatic polyether ketone-based resin such as an aromatic polyether ketone resin, a polyether ether ketone resin and a polyphenylene ether resin; and a polyacetal-based resin; a polyphenylene sulfide-based resin; a bismaleimide triazine-based resin. In 100 parts by mass of the entire resin contained in the resin body used in an embodiment of the present invention, a content of the resin other than the fluorine-based resin is preferably 20 parts or less by mass, more preferably 10 parts or less by mass, further preferably 5 parts or less by mass, particularly preferably 1 part or less by mass and most preferably 0 parts by mass (the resin body contains no other resins than the fluorine-based resin).

The resin body that can be used in an embodiment of the present invention may have any form having a shape that enables performance of plasma irradiation described later, and the form may have various shapes and structures. Examples of the form of the resin body include, but are not limited to, a square shape, a spherical shape and a thin film shape that have surface shapes such as a flat surface, a curved surface and a bent surface. The resin body may be formed by various molding methods such as injection molding, melt extrusion molding, paste extrusion molding, compression molding, cutting molding, cast molding and impregnation molding according to a characteristic of the fluorine-based resin. In addition, the resin body may have, for example, a dense continuous structure like a normal injection molded body, a porous structure, a non-woven fabric-like structure or another structure.

The resin body has a thickness of preferably 1 μm or more. From the view point of enhancing an insulation property and reducing a transmission loss, the thickness is more preferably 5 μm or more and further preferably 10 μm or more. The upper limit of the thickness of the resin body is not limited, but when used as a flexible printed wiring board, the resin body is preferably thin, and the upper limit of the thickness is, for example, 5 mm or less.

An embodiment of the present invention does not necessitate roughening a surface of the resin body with sandpaper or the like. The resin body has a surface roughness Ra of preferably 1 μm or less, more preferably 0.5 μm or less and further preferably 0.3 μm or less. The surface roughness Ra can be obtained through a measurement in accordance with JIS B 0601, and the surface roughness Ra of each of laminated bodies in Examples described later is 0.3 μm or less.

<Gel Body>

The gel body contains the silicone gel. Examples of the silicone gel include, but are not limited to, an addition curing type liquid silicone gel and a heat vulcanizing type millable type silicone gel for whose vulcanization a peroxide is used. The silicone gel is preferably the addition curing type liquid silicone gel.

To obtain a firm and strong gel body, the gel body preferably has a small penetration value. However, even the gel body having a relatively large penetration value (for example, the gel body having a penetration value of around 30 to 50) can be firm and strong by increasing a thickness of the gel body or by making the gel body contain a relatively large amount of the lipophilic silica particles described later. As a result, the gel body can prevent itself from being broken when the laminated body is removed from an adherend. The gel body has a penetration value of preferably 50 or less, more preferably 40 or less and further preferably 30 or less. The lower limit of the penetration value of the gel body is, for example, 0 or more, preferably 1 or more and more preferably 3 or more, but is not particularly limited thereto. A method for measuring the penetration value will be described later.

The gel body further contains the lipophilic silica particles. Relative to 100 parts by mass of the silicone gel contained in the gel body, a content of the lipophilic silica particles in the gel body is preferably 5 to 27 parts by mass, more preferably 10 to 25 parts by mass and further preferably 15 to 25 parts by mass. The gel body containing 5 parts or more by mass of the lipophilic silica particles has a small loss factor tan δ. That is, the gel body becomes less susceptible to a viscosity and can be firm and strong. As a result, the gel body can prevent itself from being broken when the laminated body is removed from the adherend. On the other hand, if the content of the lipophilic silica particles becomes more than 27 parts by mass, such a content causes a lot of air bubbles to be generated in the gel body during production of the gel body. As a result, the gel body and the resin body might be unable to adhere to each other.

The gel body has a thickness of preferably 1 mm or more, more preferably 2 mm or more and further preferably 3 mm or more. The gel body having the thickness of 1 mm or more can prevent itself from being easily broken. The upper limit of the thickness of the gel body is not limited, but is, for example, 30 mm or less from the view point of a cost and an appearance.

The gel body has the loss factor tan δ of preferably 0.580 or less and more preferably 0.560 or less. The gel body having the loss factor tan δ of 0.580 or less becomes less susceptible to a viscosity and can be firm and strong. As a result, the gel body can prevent itself from being broken. A method for measuring the loss factor tan δ will be described later.

<Lipophilic Silica Particles>

Since silica particles contain silanol groups, the silica particles are hydrophilic. However, the silica particles can be turned into the lipophilic silica particles by chemically altering the silanol groups present in surfaces of the silica particles. Hereinafter, the silica particles before the chemical alteration is referred to as hydrophilic silica particles. A compound used for the above alteration may be any compound that can chemically react with —OH of the silanol groups in the hydrophilic silica particles and can introduce lipophilic groups (hydrophobic groups) into the silanol groups. The compound is preferably at least one of dialkylsilane such as dimethyldichlorosilane, diethyldichlorosilane, dimethyldibromosilane and diethyldibromosilane; trialkylsilane such as trimethylchlorosilane, triethylchlorosilane, trimethylbromosilane and triethylbromosilane; polysiloxane such as dimethylpolysiloxane; aminosilane such as 3-aminopropyltrimethoxysilane and 3-aminopropyltriethoxysilane; or polysilazane such as perhydropolysilazane, methylpolysilazane, dimethylpolysilazane, phenylpolysilazane and vinyl polysilazane. With such a compound as the above one, surfaces of the hydrophilic silica particles are modified to introduce the lipophilic groups such as alkyl groups (particularly methyl groups) and amino groups (particularly $NH_2$ groups) into the silanol groups. As a result, the lipophilic silica particles can be obtained.

<Adhesive Strength>

In the laminated body according to an embodiment of the present invention, an adhesive strength between the resin body and the gel body (hereinafter may be simply referred to as "adhesive strength") is preferably 0.4 N/mm or more, more preferably 0.6 N/mm or more, further preferably 0.8 N/mm or more and particularly preferably 1.0 N/mm or more. The adhesive strength of less than 0.4 N/mm might cause the gel body to be broken or might cause the resin body and the gel body to be peeled off each other when the laminated body is removed from the adherend. A method for measuring the adhesive strength will be described later.

<Method for Producing Laminated Body>

Hereinafter, a method for producing the laminated body according to an embodiment of the present invention is described.

The method for producing the laminated body includes a step of producing a surface-modified resin body by performing plasma treatment on the surface of the resin body with an oxygen concentration near the surface of the resin body being less than 0.5% by volume, and includes the following step (I) or step (II).

(I) heat-curing the gel body and performing plasma treatment on a surface of the heat-cured gel body with an oxygen concentration near the surface of the heat-cured gel body being 1% or more by volume to produce a surface-modified gel body, and then laminating the surface-modified gel body and the surface-modified resin body (II) laminating the surface-modified resin body and a gel-like material and then heat-curing the gel-like material to form the gel body 1. Step of Performing Plasma Treatment on Surface of Resin Body The surface of the resin body merely needs to be modified by performing the plasma treatment on the surface of the resin body with a temperature of the surface of the resin body preferably being (a melting point of the fluorine-based resin −150° C.) or higher. Setting a surface temperature in such a manner leads to an increase in mobility of macromolecules of a polymer compound in the surface of the resin body to be subjected to plasma irradiation. When such a polymer compound with increased mobility is irradiated with plasma, the plasma breaks bonds each formed between a carbon atom and a carbon atom or another atom in the polymer compound. The carbon atoms whose bonds are broken in the polymer compound lead to a crosslinking reaction between the carbon atoms and to sufficient formation of peroxide radicals in the surface of the resin body. In particular, when the fluorine-based resin contained in the resin body is PTFE, the surface temperature of the resin body is preferably 180° C. or higher and more preferably 200° C. or higher. The upper limit of the surface temperature of the resin body may be, for example, (a melting point+20°) C. or lower, but is not particularly limited thereto.

In a state where oxygen is reduced as much as possible near the surface of the resin body, the plasma treatment is performed on the surface of the resin body to sufficiently form peroxide radicals in the surface of the resin body, thus modifying the surface of the resin body. Specifically, the surface-modified resin body is produced by performing the plasma treatment on the surface of the resin body with the oxygen concentration near the surface of the resin body (a plasma irradiation region) being less than 0.5% by volume. As for the plasma treatment, for example, atmospheric pressure plasma treatment may be performed with the surface temperature being high to modify the surface of the resin body. By performing the atmospheric pressure plasma treatment, radicals, electrons, ions or the like contained in the plasma induce formation of dangling bonds in the surface of the resin body through defluorination. The atmospheric pressure may not strictly be 1,013 hPa and may fall within a range of 700 to 1,300 hPa. Thereafter, the surface of the resin body is exposed to an atmosphere for about several minutes to 10 minutes to cause a reaction with water components in the atmosphere, which consequently leads to spontaneous formation of hydrophilic functional groups such as hydroxy groups and carbonyl groups in addition to peroxide radicals in the dangling bonds.

In an embodiment of the present invention, the surface of the resin body is preferably modified with atmospheric pressure plasma. A preferable condition for the atmospheric pressure plasma treatment is to set output power density within a predetermined range described later with the surface temperature of the resin body set in the above predetermined range. The condition may be any appropriate condition enabling generation of atmospheric pressure plasma that can be employed in technical fields for modifying a surface of a resin body by plasma.

Naturally, in an embodiment of the present invention, the atmospheric pressure plasma treatment is performed with the surface temperature of the resin body set in the predetermined temperature range that enables an increase in the mobility of the macromolecules of the fluorine-based resin in the surface of the resin body. If the surface temperature is raised only by a heating effect of the atmospheric pressure plasma treatment, the atmospheric pressure plasma treatment is preferably performed under a condition by which the heating effect is obtained.

For generation of the atmospheric pressure plasma, a high frequency power supply having an applied voltage frequency of 50 Hz to 2.45 GHz may be used. The output power density (output power per unit area) may be, for example, 15 $W/cm^2$ or more although the output power density depends on a plasma generator, a constituent material of the resin body or the like. The upper limit of the output power density may be, for example, 40 $W/cm^2$ or less, but is not particularly limited thereto.

In addition, in the case where pulsed output is used, a pulse modulated frequency may be 1 to 50 kHz (preferably 5 to 30 kHz), and a pulse duty may be 5 to 99% (preferably 15 to 80% and more preferably 25 to 70%). As a pair of electrodes, a cylindrical or plate-shaped metal with at least one side coated with a dielectric substance may be used. A distance between these electrodes is preferably 5 mm or less, more preferably 3 mm or less, further preferably 2 mm or less and particularly preferably 1 mm or less from the view point of the plasma generation and heating although the distance depends on other conditions. The lower limit of the distance between the electrodes is, for example, 0.5 mm or more, but is not particularly limited thereto.

A gas used for generating the plasma may be, for example, a rare gas such as helium, argon and neon or a reactive gas such as oxygen, nitrogen and hydrogen. That is, the gas used in an embodiment of the present invention is preferably a non-polymerizable gas only.

Among these gases, one or more kinds of the rare gases alone may be used. Alternatively, a gas mixture containing one or more kinds of the rare gases and an appropriate amount of one or more kinds of the reactive gases may be used.

The plasma generation may be performed under a condition in which an atmosphere of the above gas is controlled with a chamber or under a completely open-to-atmosphere condition in which, for example, the rare gas is made to flow to the electrodes.

In an embodiment of the present invention, the plasma treatment hardly has an effect on the surface of the resin body opposite to a plasma irradiation surface (an effect of a firmness improvement or the like is smaller than that on the plasma irradiation surface). Hence, various characteristics inherent in the fluorine-based resin (for example, chemical resistance, weather resistance, heat resistance, electrical insulation or the like) are not impaired and are sufficiently exhibited.

Hereinafter will be described, with reference to FIG. 1A and FIG. 1B, one example of an embodiment of the atmospheric pressure plasma treatment applicable to the method for producing the resin body used in an embodiment of the present invention mainly in a case where the resin body is in a form of a sheet (thickness: 0.2 mm) made of PTFE. However, the embodiment of the present invention is by no means limited to such an example and may be naturally carried out in various configurations without departing from the gist of the embodiment of the present invention.

FIG. 1A and FIG. 1B are conceptual diagrams of a capacitively coupled atmospheric pressure plasma treatment apparatus that is one example of the atmospheric pressure plasma treatment apparatus that can be used in an embodiment of the present invention. The atmospheric pressure plasma treatment apparatus A shown in FIG. 1A includes a high frequency power supply 10, a matching unit 11, a chamber 12, a vacuum exhaust system 13, an electrode 14, an electrode elevating mechanism 15, a grounded cylindrical rotary stage and sample holder 16 and a rotary stage control part (unillustrated). The rotary stage 16 is disposed in such a manner as to face the electrode 14. The cylindrical rotary stage and sample holder 16 may be, for example, made of an aluminum alloy. The electrode 14 may have a rod shape and a structure in which a surface of an inner tube 18 made of, for example, copper is coated with an outer tube 19 made of, for example, aluminum oxide ($Al_2O_3$) as shown in FIG. 1B.

A method for modifying the surface of the resin body with the atmospheric pressure plasma treatment apparatus A shown in FIG. 1A and FIG. 1B are as follows. First, the resin body is washed with an organic solvent such as acetone or with water such as ultrapure water, if necessary, and then a sample (the resin body containing the fluorine-based resin) 20 in the sheet form is disposed on the sample holder 16 in the chamber 12 as shown in FIG. 1A. Thereafter, air in the chamber 12 is sucked through the vacuum exhaust system 13 with an unillustrated suction apparatus to reduce a pressure in the chamber 12 and a gas for generation of the plasma is supplied into the chamber 12 (see an arrow in FIG. 1A) to adjust an inside of the chamber 12 to have the atmospheric pressure. The sample 20 is unillustrated in FIG. 1A and is only shown in FIG. 1B described later.

The apparatus as in FIG. 1A enables the plasma treatment to be performed with the oxygen concentration near the surface of the resin body (the plasma irradiation region) being less than 0.5% by volume.

Next, a height (in the vertical direction in FIG. 1A) of the electrode elevating mechanism 15 is adjusted to move the electrode 14 to a desired position. By adjusting the height of the electrode elevating mechanism 15, a distance between the electrode 14 and a surface (an upper surface) of the sample 20 can be adjusted. The distance between the electrode 14 and the surface of the sample 20 is preferably 5 mm or less and more preferably 2 mm or less. In particular, in a case where the surface temperature of the resin body is controlled to be in a specific range by natural temperature rise due to the plasma treatment, the distance is particularly preferably 1.0 mm or less. As a matter of course, the electrode 14 and the sample 20 should not be brought into contact with each other to move the sample 20 by rotation of the rotary stage 16.

In addition, rotating the rotary stage 16 enables irradiation of the plasma on a desired part of the surface of the resin body. A rotation speed of the rotary stage 16 is, for example, preferably 1 to 3 mm/sec, but the embodiment of the present invention is by no means limited to such an example. A time of the plasma irradiation for the sample 20 can be adjusted by, for example, varying the rotation speed of the rotary stage 16 or repeatedly rotating the rotary stage 16 a desired number of times.

While moving the rotary stage 16 to move the sample 20, the high frequency power supply 10 is operated to generate the plasma between the electrode 14 and the rotary stage 16 in order to irradiate a desired area of the surface of the sample 20 with the plasma. In this case, glow discharge can be generated under a dielectric substance barrier discharge condition, for example, by using, as the high frequency power supply 10, a power supply having the above applied voltage frequency and the above output power density and, for example, by using an electrode made of alumina-coated copper and a sample holder made of an aluminum alloy. Hence, peroxide radicals can be stably produced in the surface of the resin body. Radicals, electrons, ions and the like contained in the plasma induce formation of dangling bonds in the surface of the PTFE sheet through defluorination. These dangling bonds react with water components or the like in air by exposing the surface of the PTFE sheet to air remaining in the chamber or to clean air after the plasma treatment. As a result, the peroxide radicals are introduced into the surface of the PTFE sheet. In addition to the peroxide radicals, hydrophilic functional groups such as hydroxy groups and carbonyl groups can be spontaneously formed in the dangling bonds.

An intensity of the plasma with which the surface of the resin body is irradiated can be appropriately adjusted according to the above various parameters of the high frequency power supply, the distance between the electrode 14 and the surface of the resin body or the like. The above preferable conditions (the applied voltage frequency, the output power density, the pulse modulated frequency, the pulse duty and the like) for the atmospheric pressure plasma generation are effective particularly in a case where the resin body is in the form of a sheet made of PTFE. In addition, the surface of the resin body can be controlled to have a temperature in a specific range by adjusting integrated irradiation time for the surface of the resin body according to the output power density. For example, in a case where the applied voltage frequency is 5 to 30 MHz, where the distance between the electrode 14 and the surface of the resin body is 0.5 to 2.0 mm and where the output power density is 15 to 30 W/cm$^2$, the integrated irradiation time for the surface of the resin body is preferably 50 seconds to 3,300 seconds, more preferably 250 seconds to 3,300 seconds and particularly preferably 550 seconds to 2,400 seconds. Particularly preferably, the surface temperature of the resin body in the form of the sheet made of PTFE is 210 to 327° C., and the irradiation time is 600 to 1,200 seconds. If the irradiation time becomes excessively long, such a time tends to cause an influence of heat to arise. The plasma irradiation time means integrated time of irradiating the surface of the resin body with the plasma. At least partially during this plasma irradiation time, the surface temperature of the resin body merely needs to be (a melting point −150°) C. or higher. For example, the surface temperature of the resin body merely needs to be (a melting point −150°) C. or higher during ½ or longer (preferably ⅔ or longer) of the plasma irradiation time. In any aspect, setting the surface temperature of the resin body to the above range increases mobility of PTFE molecules in the surface of the resin body. The increased mobility remarkably improves a probability of forming carbon-carbon bonds through binding of carbon atoms of carbon-fluorine bonds in the PTFE molecules that are broken by the plasma to carbon atoms in the other PTFE molecules that are caused in the same manner, thus improving firmness of the surface.

A heating means for heating the sample 20 can be additionally provided. As shown in FIG. 1B, a heat ray irradiation device such as a halogen heater 17 may be disposed near the electrode 14 to directly heat the surface of the resin body. A heating device for heating the above gas in the chamber 12 and a circulation device equipped with a stirring blade or the like for circulating the heated gas in the chamber 12 may be disposed in the chamber 12 to increase an environmental temperature in the chamber 12. A heating means may be disposed on the rotary stage 16 to heat the sample 20 from the lower surface side. These devices may be used in combination. A heating temperature of the heating means may be appropriately set and controlled in consideration of a characteristic of the fluorine-based resin contained in the resin body, a form of a molded body, the heating effect of the plasma treatment or the like. Before the high frequency power supply 10 is operated, the molded body is preferably preheated so that a temperature of the molded body reaches a desired temperature upon the plasma irradiation.

During the plasma treatment, a surface temperature of the molded body can be measured with a radiation thermometer 21 as shown in FIG. 1B or with a temperature measurement sticker.

2. Step of Performing Plasma Treatment on Surface of Gel Body

To improve adhesiveness between the gel body and the resin body, modification of a surface of the gel body is considered. However, the adhesiveness between the gel body and the resin body cannot be improved by performing atmospheric pressure plasma treatment with the above apparatus shown in FIG. 1A and FIG. 1B in the same manner as in the resin body. It has been, though, found that the adhesiveness between the gel body and the resin body can be improved by producing the surface-modified gel body through plasma treatment performed on a surface of the gel body with the oxygen concentration near the surface of the gel body (a plasma irradiation region) being 1% or more by volume. Atmospheric pressure plasma treatment for the surface of the gel body is preferably plasma jet treatment but is not particularly limited thereto. The step 2. and the step 3. below will describe a step of performing the plasma treatment on the surface of the gel body (the above step (I)). The method 4. below will describe a method for improving the adhesiveness between the gel body and the resin body without performing the plasma treatment on the surface of the gel body (the above step (II)).

The oxygen concentration near the surface of the gel body is preferably 3% or more by volume, more preferably 5% or more by volume, further preferably 7% or more by volume and particularly preferably 10% or more by volume.

Hereinafter, an example of an embodiment of the plasma jet treatment applicable to the gel body used in an embodiment of the present invention will be described with reference to the drawing. However, the embodiment of the present invention is by no means limited to such an example, and may be naturally carried out in various configurations without departing from the gist of the embodiment of the present invention.

FIG. 2 is a conceptual diagram of a plasma irradiation head used in a plasma jet treatment apparatus that can be used in an embodiment of the present invention. The plasma irradiation head 31 is a so-called remote plasma treatment apparatus in which plasma generated in a reaction chamber 33 is blown out towards an object to be treated (a sample 38) placed outside the plasma irradiation head 31. The plasma irradiation head 31 includes a pair of electrodes 32 and 32 disposed to face each other. One of the electrodes 32 and 32 is connected to a power supply, and the other is electrically grounded (a power supply and grounding are unillustrated). When a voltage is supplied from the power supply in a state where a gas is caused to flow into the reaction chamber 33, plasma can be generated. In the plasma irradiation head 31, a treatment gas G is introduced from a gas supply device 34 into an inflow path (a gas introduction port) 35 to generate plasma (that is, a plasmatized treatment gas). The plasma is blown out through gas blowout ports 37 formed in a framework 36 towards the surface of the sample (the gel body) 38 placed below the gas blowout ports 37. Lower parts of the gas blowout ports 37 are not sealed so that atmospheric air flows into the gas blowout ports 37. Due to this atmospheric air flow, the oxygen concentration near the sample 38 is higher than an oxygen concentration in the gas G near the inflow path 35. The gas G may be at least one selected from the group consisting of nitrogen and air. In addition, a distance between the gas blowout ports 37 and the surface of the sample 38 is preferably 50 mm or less and more preferably 20 mm or less.

By moving a stage 39 vertically and horizontally, a desired part of the sample 38 can be irradiated with the plasma. For example, a movement speed of the stage 39 is preferably 0.5 to 10 mm/sec, but the embodiment of the present invention is by no means limited to such an example. A plasma irradiation time for the sample 38 can be adjusted by, for example, varying the movement speed of the stage 39 or reciprocating the stage 39 a desired number of times.

3. Step of Contacting and Adhering Resin Body and Gel Body

The surface-modified resin body and the surface-modified gel body can be directly joined to each other by thermocompression-bonding (heating and pressurizing) the surface-modified resin body and the surface-modified gel body with the modified surface of the surface-modified resin body and the modified surface of the surface-modified gel body being in contact with each other. As a result, a joined body of the resin body and the gel body can be obtained. The thermocompression bonding may be performed in any manner that does not break the gel during the thermocompression bonding and may be, for example, performed by heating and pressurizing the surface-modified resin body and the surface-modified gel body for about 5 to 40 minutes at a heating temperature of 120 to 200° C. and a pressure of 0.3 to 10 MPa.

A mechanism by which the resin body and the gel body are joined (adhered) to each other to achieve a favorable adhesive strength is considered as follows but is not limited to the following mechanism.

Performing the plasma treatment with high power on the surface of the resin body introduces more peroxide radicals in the surface of the resin body, and these peroxide radicals induce formation of more C—OH groups or COOH groups (carboxy groups) in the surface of the resin body than those formed through the plasma treatment with low power. On the other hand, performing the plasma treatment on the surface of the gel body leads to formation of C—OH groups or COOH groups (carboxy groups) in the surface of the gel body. By modifying the surfaces of the resin body and the gel body in this manner, the adhesiveness between the resin body and the gel body can be improved. In addition, the gel body containing the lipophilic silica particles becomes firm and strong as described above, thus enhancing a mechanical strength of the gel. This enhanced mechanical strength can prevent the gel body from being broken when the laminated body is removed from the adherend. As a result, the laminated body that can be attached to and detached from the adherend for use can be obtained.

In the laminated body, the resin body and the gel body preferably have plasma-treated surfaces, and the plasma-treated surface of the resin body and the plasma-treated surface of the gel body are preferably directly joined to each other. Performing the above plasma treatment enables obtention of the laminated body having an excellent adhesive strength without necessity of performing other surface modifications than the plasma treatment. In addition, the resin body and the gel body can be directly joined to (laminated with) each other without laminating another layer between the resin body and the gel body.

4. Method for Producing Laminated Body of the Present Invention without Performing Plasma Treatment on Surface of Gel Body Instead of the above steps 2. and 3., the adhesive strength can also be improved by laminating the surface-modified resin body and an uncured gel-like material, and then heat-curing the gel-like material to form the gel body. An example method for producing the laminated body includes setting the surface-modified resin body in a mold, pouring the gel-like material containing the silicone gel and the lipophilic silica particles onto the surface-modified resin body and then heat-curing the gel-like material to form the gel body. Another example method for producing the laminated body includes pouring the gel-like material containing the silicone gel and the lipophilic silica particles into a mold, laminating the surface-modified resin body on the gel-like material and then heat-curing the gel-like material to form the gel body. Heat-curing the gel-like material in the above manner generates silanol groups in a surface of the gel body. These silanol groups interact (form chemical bonds or hydrogen bonds) with oxygen-containing functional groups or C—O—O* (peroxide radicals) present near the plasma-treated surface of the resin body. Such an interaction is presumed to enable the adhesive strength to be 0.4 N/mm or more even though the laminated body is produced through the above step (II) instead of the above step (I) (the above steps 2. and 3.).

<Others>

AFM-IR, which is an apparatus having a combination of an surface form observation function of an atomic force microscope (AFM) and a functional group identification function of infrared spectroscopy (IR), has a very high spatial resolution of about 10 nm, so that AFM-IR can clarify not only information on a surface form but also distribution of functional groups present in the surface. Analyzing a cross-section of the laminated body in an embodiment of the present invention (such as a laminated body including a PTFE sheet and a silicone gel sheet in Examples described later) with the AFM-IR can identify not only a constituent material of the laminated body but also a surface modification depth (100 nm or less) or an interface roughness (200 nm or less) by the plasma treatment, thus enabling reverse engineering. Hence, comprehensive evaluation of a plurality of data obtained from the above apparatus can show that the surface of the resin body on which the gel body is laminated is modified through no other treatment than the plasma treatment.

EXAMPLES

Hereinafter, an embodiment of the present invention will be explained more concretely with reference to examples. The embodiment of the present invention should not be considered as being limited by the following examples, and, of course, modifications can be made appropriately without departing from the context mentioned above and below, and all of such modifications are within the technical scope of the embodiment of the present invention.

Example 1

A PTFE sheet and a silicone gel sheet were prepared respectively in the following manner.

<Ptfe Sheet>

(A-1) Cleaning

At Nitto Denko Corporation, a PTFE sheet (Nitoflon No. 900UL) that had been cut to a thickness of 0.2 mm was cut into a certain size (width: 4.5 cm×length: 7 cm) to prepare a resin body. This resin body was ultrasonically cleaned in acetone for 1 minute and then ultrasonically cleaned in pure water for 1 minute. Thereafter, the pure water on the PTFE sheet was removed by blowing nitrogen gas (purity: 99% or more) with an air gun.

(A-2) High Temperature Plasma Treatment

A surface of the PTFE sheet that had been subjected to the cleaning in the above (A-1) was modified with plasma using a plasma generator (a product name K2X02L023, manufactured by Meisyo Kiko Co., Ltd.) having a configuration shown in FIG. 1A and FIG. 1B.

A high frequency power supply of the plasma generator had an applied voltage frequency of 13.56 MHz. An electrode had a structure in which a copper tube having an inner diameter of 1.8 mm, an outer diameter of 3 mm and a length of 165 mm was coated with an alumina tube having an outer diameter of 5 mm, a thickness of 1 mm and a length of 145 mm. A sample holder was made of an aluminum alloy and had a cylindrical shape with a diameter of 50 mm and a width of 3.4 cm. The PTFE sheet was placed on an upper surface of the sample holder in such a manner that a distance between the surface of the resin body and the electrode became 1.0 mm.

A chamber was sealed, and a pressure in the chamber was reduced to 10 Pa with a rotary pump. Then, helium gas was introduced into the chamber until the pressure reached the atmospheric pressure (1,013 hPa). Thereafter, the high frequency power supply was set to have an output power density of 19.1 W/cm$^2$, and a scanning stage was set to move at a movement speed of 2 mm/sec such that the electrode passed over the resin body by 30 mm in a longitudinal direction of the resin body. The high frequency power supply was then operated, and the scanning stage was moved to perform plasma irradiation in an area of width: 1.0 cm×length: 3.4 cm. A plasma irradiation time was defined to be a time taken by the scanning stage to move by 30 mm in the longitudinal direction 60 times (reciprocate 60 times). In addition, an oxygen concentration near the surface of the PTFE sheet (a plasma irradiation region) was measured with a zirconia type oxygen concentration meter LC-300 manufactured by Toray Engineering Co., Ltd. The oxygen concentration was 25.7 ppm and significantly lower than 0.5% by volume. A temperature of the surface of the resin body during plasma treatment was measured with a radiation thermometer (FT-H40K and FT-50A, manufactured by KEYENCE CORPORATION). The surface temperature was 203° C.

<Silicone Gel Sheet>

(B-1) Production of Silicone Gel Sheet

SILGEL612 manufactured by Wacker Chemie AG, which was a two-component addition curing type heat curable liquid silicone gel, and Nipsil (registered trademark) SS-30P manufactured by Tosoh Silica Corporation, which was lipophilic silica particles, were added and mixed together. The mixture was then heat-cured at 80° C. for 60 minutes to produce a silicone gel sheet having a width of 4.8 cm, a length of 10 cm and a thickness of 13 mm. The two-component type SILGEL612 had a component A and a component B, and relative to 100 parts by mass of the component A, 63.4 parts by mass of the component B was blended. To 100 g of the SILGEL612, 15 g of the SS-30P were added.

A penetration value of a silicone gel was measured with an apparatus (model: 840I-01) manufactured by RIGO CO., LTD. in accordance with JIS K2220. A liquid (uncured) gel was poured into a glass container having an inner diameter of 48 mm such that the gel had a height of 40 mm or more in the container, and the gel was heat-cured at 80° C. for 60 minutes to obtain a sample. With 9.38 g of a ¼ conical jig (a cone), a needle tip of the cone was set on a surface of the sample, and then the cone was allowed to penetrate the sample surface in free fall. After 5 seconds, a penetration distance of the cone from the sample surface was measured. This measurement was performed 3 times, and an average value of the 3 penetration distances was calculated down to the millimeter. A 10-fold value of the above average value was defined as the penetration value (0.1 mm was converted to a penetration value of 1). The penetration value of the silicone gel sheet produced in the above "(B-1) Production of Silicone Gel Sheet" was 10. The measurement of the penetration value was performed without adding the silica particles.

(B-2) Plasma Jet Treatment

A surface of the silicone gel sheet produced in the above (B-1) was modified by plasma jet treatment with an ultra-high density atmospheric pressure plasma unit (Tough Plasma FPE20, manufactured by FUJI CORPORATION) having a configuration shown in FIG. 2.

A flow rate of nitrogen gas to a plasma irradiation region was set to 29.7 L/min and a flow rate of air to the plasma irradiation region was set to 0.3 L/min. That is, when the total flow rate of the nitrogen gas and the air was regarded as 100%, a ratio of the air was set to 1.0%, and a ratio of oxygen was set to 0.2%. However, the apparatus was not of a sealed type, and atmospheric air flowed in near the silicone gel body. An oxygen concentration in the plasma irradiation region was measured with a zirconia type oxygen concentration meter LC-300 manufactured by Toray Engineering Co., Ltd., and the measured oxygen concentration was 11.3% by volume. A distance between the silicone gel and plasma blowout ports was set to 20 mm, and a movement speed of a stage was set to 8 mm/sec. The plasma jet treatment was performed only once without reciprocating the stage.

(C) Production of Laminated Body

The plasma-treated surface of the PTFE sheet and the plasma-treated surface of the silicone gel sheet were brought into contact with each other. The PTFE sheet and the silicone gel sheet were then subjected to heating and pressurizing treatment for 10 minutes at a temperature of 140° C. and a pressure of 0.5 MPa such that a joined area became 20 mm×30 mm and an unjoined area (a grasping margin) became 10 mm×30 mm. As a result, a laminated body including the PTFE sheet and the silicone gel sheet was produced.

With a digital force gauge (ZP-200N, manufactured by IMADA-SS Corporation) and an electric stand (MX-500N, manufactured by IMADA-SS Corporation) in combination, the grasping margin was gripped with chucks, and a T-shaped peeling test was performed by pulling the PTFE sheet and the silicone gel sheet in directions different by 180 degrees to measure an adhesive strength between the PTFE sheet and the silicone gel sheet. A load cell was set to 1 kN, and a pull speed was set to 60 mm/min. The adhesive strength was 1.12 N/mm. In all the following Examples and Comparative Examples except for Comparative Examples 3 and 4, during measurements of adhesive strengths, material failure occurred in silicone gel sheets, and interfaces between PTFE sheets and the silicone gel sheets were not broken (peeled).

In addition, the laminated body in Example 1 was subjected to attachment and detachment by being adhered to and then immediately removed from an aluminum substrate (A1050, manufactured by UACJ Corporation) 10 times in a row. After the 10-time attachment and detachment, an interface between the resin body and the gel body was not peeled, and material failure in the silicone gel sheet did not occur. The laminated body showed no change even after the 10-time attachment and detachment. In the following Examples 2 to 5, laminated bodies were attached and detached in the same manner as in Example 1, and the same results as in Example 1 were obtained.

Example 2

A laminated body was produced in the same manner as in Example 1 except that the thickness of the silicone gel sheet was changed to 3.5 mm, and an adhesive strength was measured. The adhesive strength was 0.84 N/mm. In Examples other than Example 1 and Comparative Examples, adhesive strengths were measured with the above measurement method.

Comparative Example 1

A laminated body was produced in the same manner as in Example 1 except that the lipophilic silica particles were not added, and an adhesive strength was measured. The adhesive strength was 0.34 N/mm.

Comparative Example 2

A laminated body was produced in the same manner as in Example 2 except that the lipophilic silica particles were not added, and an adhesive strength was measured. The adhesive strength was 0.21 N/mm.

Example 3

A laminated body was produced in the same manner as in Example 1 except that the method for producing the silicone gel sheet was changed from "(B-1) Production of Silicone Gel Sheet" to the following "(B-1') Production of Silicone Gel Sheet", and an adhesive strength was measured. The adhesive strength was 0.52 N/mm. In addition, a penetration value of a silicone gel sheet produced in the following (B-1') Production of Silicone Gel Sheet was calculated in the above manner. The calculated penetration value was 40.

(B-1') Production of Silicone Gel Sheet

To a mold were added 100 g of an addition curing type heat curable liquid silicone gel (KE-1062 manufactured by Shin-Etsu Chemical Co., Ltd. that had a viscosity of 700 mPa·s at 23° C. and included a Pt catalyst) and 15 g of Nipsil (registered trademark) SS-30P manufactured by Tosoh Silica Corporation, which was lipophilic silica particles. The addition curing type heat curable liquid silicone gel and the lipophilic silica particles were then stirred for 1 minute. Thereafter, the mold with the silicone gel and the like was heated in an oven at 120° C. for 30 minutes to produce a silicone gel sheet having a width of 4.8 cm, a length of 10 cm and a thickness of 13 mm.

Example 4

A laminated body was produced in the same manner as in Example 3 except that in the above (B-1'), 25 g of the lipophilic silica particles were added such that the silicone gel sheet contained 25 parts by mass of the lipophilic silica particles relative to 100 parts by mass of the silicone gel, and an adhesive strength was measured. The adhesive strength was 1.06 N/mm.

Comparative Example 3

Production of a laminated body was attempted in the same manner as in Example 3 except that in the above (B-1'), the lipophilic silica particles were added such that the silicone gel sheet contained 30 parts by mass of the lipophilic silica particles relative to 100 parts by mass of the silicone gel. However, a lot of air bubbles were generated in the silicone gel sheet, consequently making the silicone gel sheet unable to adhere to the PTFE sheet.

Comparative Example 4

A laminated body was produced in the same manner as in Example 4 except that the plasma jet treatment in the above (B-2) was not performed, and an adhesive strength was measured. The adhesive strength was 0.02 N/mm. In Comparative Example 4, during the measurement of the adhesive strength, an interface between the PTFE sheet and the silicone gel sheet was broken (peeled), but material failure of the silicone gel sheet did not occur.

Comparative Example 5

A laminated body was produced in the same manner as in Example 4 except that Nipsil (registered trademark) VN3 manufactured by Tosoh Silica Corporation, which was hydrophilic silica particles, was used instead of the lipophilic silica particles, and an adhesive strength was measured. Since the silicone gel contained oil, the hydrophilic silica was incompatible with the silicone gel. This incompatibility caused air bubbles when the hydrophilic silica and the silicone gel were stirred in a step of producing the silicone gel sheet. These air bubbles did not disappear even with a lapse of time. The presence of these air bubbles in the silicone gel sheet led to such a low adhesive strength as 0.09 N/mm.

Comparative Example 6

A laminated body was produced in the same manner as in Example 4 except that the lipophilic silica particles were not added, and an adhesive strength was measured. The adhesive strength was 0.06 N/mm.

Comparative Example 7

A laminated body was produced in the same manner as in Comparative Example 6 except that the thickness of the silicone gel sheet was changed to 3.5 mm, and an adhesive strength was measured. The adhesive strength was 0.04 N/mm.

Example 5

A laminated body was produced in the same manner as in Example 3 except that the steps from "(B-1) Production of Silicone Gel Sheet" to "(C) Production of Laminated Body" were changed to a production method in the following "(D) Production of Silicone Gel Sheet and Laminated Body", and an adhesive strength was measured. The adhesive strength in Example 5 was 0.49 N/mm that was similar to the adhesive strength in Example 3 in which only the production method of the laminated body was different. This shows that adhesive strengths become similar values even though the above production step (I) is changed to the above production step (II).

(D) Production of Silicone Gel Sheet and Laminated Body

To 100 g of an addition curing type heat curable liquid silicone gel (KE-1062 manufactured by Shin-Etsu Chemical Co., Ltd. that had a viscosity of 700 mPa·s at 23° C. and included a Pt catalyst) were added 15 g of Nipsil (registered trademark) SS-30P manufactured by Tosoh Silica Corporation, which was lipophilic silica particles. The addition curing type heat curable liquid silicone gel and the lipophilic silica particles were then stirred for 1 minute. The silicone gel thus stirred with the lipophilic silica particles was poured into a mold in which the plasma-treated PTFE sheet prepared in the above steps (A-1) and (A-2) had been placed in advance. Thereafter, the mold with the PTFE sheet, the silicone gel and the like was heated in an oven at 120° C. for 30 minutes to produce a laminated body including the PTFE sheet and the silicone gel having a width of 4.8 cm, a length of 10 cm and a thickness of 13 mm.

Table 1 shows compositions and physical properties of the laminated bodies in Examples 1 to 5 and Comparative Examples 1 to 7. The numerals (I) and (II) in the column of Production Step correspond to the numerals used in the descriptions of the method for producing the laminated body according to an embodiment of the present invention.

TABLE 1

| | Plasma Treatment | | Production Step | Thickness of Silicone Gel Sheet | Penetration Value of Silicone Gel | Kind of Silica Particles | Addition Ratio of Silica Particles | Adhesive Strength (N/mm) |
| --- | --- | --- | --- | --- | --- | --- | --- | --- |
| | PTFE Sheet | Silicone Gel Sheet | | | | | | |
| Example 1 | Performed | Performed | (I) | 13 mm | 10 | Lipophilic Silica | 15% by mass | 1.12 |
| Example 2 | Performed | Performed | (I) | 3.5 mm | 10 | Lipophilic Silica | 15% by mass | 0.84 |
| Example 3 | Performed | Performed | (I) | 13 mm | 40 | Lipophilic Silica | 15% by mass | 0.52 |
| Example 4 | Performed | Performed | (I) | 13 mm | 40 | Lipophilic Silica | 25% by mass | 1.06 |

TABLE 1-continued

| | Plasma Treatment | | Production Step | Thickness of Silicone Gel Sheet | Penetration Value of Silicone Gel | Kind of Silica Particles | Addition Ratio of Silica Particles | Adhesive Strength (N/mm) |
|---|---|---|---|---|---|---|---|---|
| | PTFE Sheet | Silicone Gel Sheet | | | | | | |
| Example 5 | Performed | Not Performed | (II) | 13 mm | 40 | Lipophilic Silica | 15% by mass | 0.49 |
| Comparative Example 1 | Performed | Performed | (I) | 13 mm | 10 | Not Added | — | 0.34 |
| Comparative Example 2 | Performed | Performed | (I) | 3.5 mm | 10 | Not Added | — | 0.21 |
| Comparative Example 3 | Performed | Performed | (I) | 13 mm | 40 | Lipophilic Silica | 30% by mass | Unable to Produce Laminated Body |
| Comparative Example 4 | Performed | Not Performed | (I) | 13 mm | 40 | Lipophilic Silica | 25% by mass | 0.02 |
| Comparative Example 5 | Performed | Performed | (I) | 13 mm | 40 | Hydrophilic Silica | 25% by mass | 0.09 |
| Comparative Example 6 | Performed | Performed | (I) | 13 mm | 40 | Not Added | — | 0.06 |
| Comparative Example 7 | Performed | Performed | (I) | 3.5 mm | 40 | Not Added | — | 0.04 |

In addition, loss factors tan δ were measured in Example 4 in which 25% by mass of the lipophilic silica particles was added, in Example 3 that was the same as Example 4 except that 15% by mass of the lipophilic silica particles was added and in Comparative Example 6 that was the same as Example 4 except that the lipophilic silica particles were not added. The loss factors tan δ were 0.465 in Example 4, 0.549 in Example 3 and 0.592 in Comparative Example 6. This shows that a larger addition amount of the lipophilic silica particles leads to less susceptibility to the viscosity and thus makes the gel body firm and strong. The loss factors tan δ were measured with model: Rheogel-E4000 manufactured by UBM in a compression measurement mode with a strain amount of 20 μm, a frequency of 10 Hz and a measurement time of 5 minutes.

REFERENCE SIGNS LIST

10 high frequency power supply
11 matching unit
12 chamber
13 vacuum exhaust system
14 electrode
15 electrode elevating mechanism
16 cylindrical rotary stage and sample holder
17 halogen heater
18 inner tube
19 outer tube
20 sample (resin body containing fluorine-based resin)
21 radiation thermometer
31 plasma irradiation head
32 electrode
33 reaction chamber
34 gas supply device
35 inflow path (gas introduction port)
36 framework
37 gas blowout port
38 sample (gel body)
39 stage
G gas

The invention claimed is:
1. A laminated body comprising:
   a resin body; and
   a gel body,
   wherein the resin body comprises a fluorine-based resin, and
   the gel body comprises a silicone gel and 15 to 27 parts by mass of lipophilic silica particles relative to 100 parts by mass of the silicone gel.
2. The laminated body according to claim 1,
   wherein an adhesive strength between the resin body and the gel body is 0.4 N/mm or more.
3. The laminated body according to claim 1,
   wherein the lipophilic silica particles have surfaces modified with at least one of dialkylsilane, trialkylsilane, polysiloxane, aminosilane or polysilazane.
4. The laminated body according to claim 1,
   wherein the fluorine-based resin is polytetrafluoroethylene or a copolymer of at least one of a hexafluoropropylene unit, a perfluoroalkyl vinyl ether unit, a methylene unit, an ethylene unit or a perfluorodioxole unit and at least one of a difluoromethylene unit or a tetrafluoroethylene unit.
5. The laminated body according to claim 1,
   wherein the resin body has a plasma-treated surface.
6. The laminated body according to claim 5,
   wherein the gel body has a plasma-treated surface.
7. The laminated body according to claim 6,
   wherein the plasma-treated surface of the resin body and the plasma-treated surface of the gel body are directly joined to each other.

* * * * *